May 18, 1965  E. J. DOCKAL  3,183,620
FISHING TACKLE DEVICE
Filed May 19, 1964

EMIL J. DOCKAL,
INVENTOR.

BY C. M. KUCERA,
ATTORNEY.

United States Patent Office 3,183,620
Patented May 18, 1965

3,183,620
FISHING TACKLE DEVICE
Emil J. Dockal, 8606 Kellett, Houston 28, Tex.
Filed May 19, 1964, Ser. No. 368,633
4 Claims. (Cl. 43—42.74)

This invention relates generally to fishing tackle, and more particularly to a multiple leader and hook device.

It is an object of this invention to provide a fishing tackle device which may use a plurality of hooks and leaders so that several baits or a variety of baits may be used simultaneously.

It is anther object of this invention to provide a new and improved fishing tackle device having a plurality of hooks so arranged that they will not tangle when the device is cast or when it is in use.

Another object of this invention is to provide a new and improved fishing tackle device wherein the buoyancy of said device may be varied.

Another object is to provide a fishing tackle device which may be adjusted to float in the water or to sink through the water at some predetermined rate.

Another object of this invention is to provide a fishing tackle device having a plurality of leaders and hooks thereon which device will remain upright when in use.

Another object is to provide an elongate, hollow body member for a fishing tackle device which is open at its bottom end, and closed at its upper end, and which is provided with a plurality of openings in the upper portion thereof which openings may be selectively closed or opened as desired.

Another object is to provide a fishing tackle device having adequate weight for casting and wherein separate weights for the device may be eliminated.

Another object is to provide a fishing tackle device which is economical to manufacture and efficient in operation.

Other objects will become apparent from the following description and the accompanying drawings, in which.

Figures 1, 2, 3:
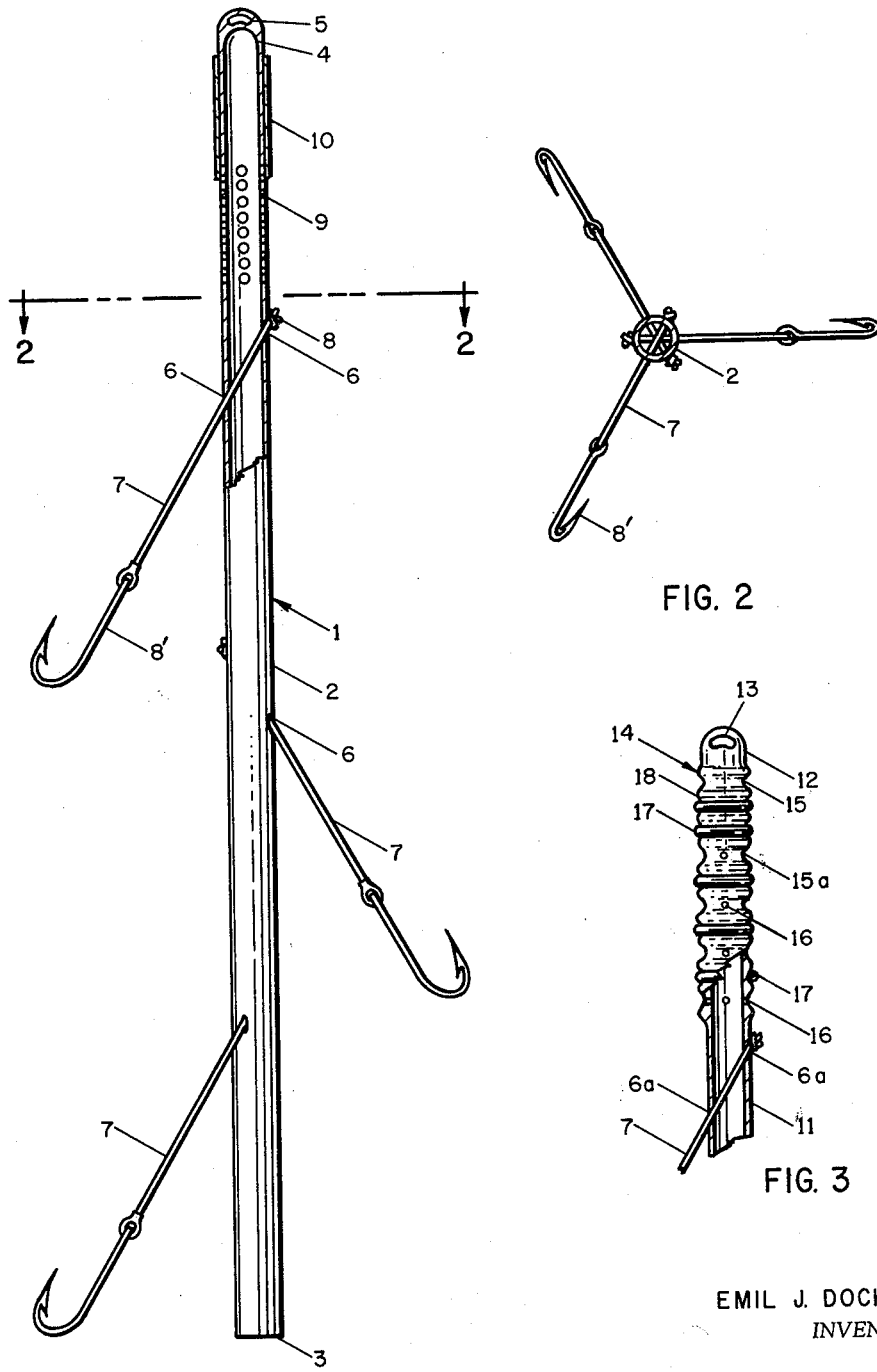
FIGURE 1 is a side elevational view of the fishing tackle device, partly in section.
FIGURE 2 is a cross sectional view taken along line 2—2 in FIGURE 1.
FIGURE 3 is a fragmentary side elevational view, partly in section, of another embodiment of the invention.

Referring to the drawings, the fishing tackle device is shown generally at 1 and comprises an elongate, generally cylindrical hollow body member 2 which may be made of plastic or any other suitable material. The lower end of the body member 2 is open as shown at 3, and the top thereof may be closed as shown at 4. The closure 4 may be effected by squeezing together under heat the upper end of the body member 2. The upper end of the member may have an opening 5 through which an end of a fishing line (not shown) may be attached. A series of holes 6 may be drilled diagonally through the body 2 at selected intervals along the device. A leader 7, which may be made of nylon or other suitable material, may be passed through the holes 6 and knotted as shown at 8 to secure one end of the leader to the member 2. A hook 8' may be secured to the other end of the leader. A series of openings 9 may be provided through the member 2 at the upper portion thereof. A cylindrical sleeve 10 is slidably secured to the outside of the member 2 and may be of sufficient length to cover all of the openings 9 if desired. It is of course apparent that the sleeve 10 may be moved downwardly to cover only a few of the openings if desired, and it will be apparent that air may be trapped in the member 2 near the upper end there of when the device is cast into the water.

The amount of air trapped is of course dependent upon the position of the sleeve 10 with respect to the openings 9, and if it is desired that more air be trapped, the sleeve 10 may be moved downwardly to cover more of the openings. Even if all of the openings remain open, there is usually a sufficient amount of air trapped near the upper end of the member 2 so that the fishing device remains substantially upright when it is in the water.

If desired, the amount of air trapped may be such that the upper end of the device when placed in the water will remain near the surface thereof but allow the leaders 7 and hooks 8' to be submerged. Also, depending upon the number of the openings 9 which are covered by the sleeve 10, the rate of descent of the fishing device in the water may be varied as desired.

Longitudinal slots may be substituted for the openings 9 which slots may be covered by the sleeve 10 in a manner similar to that just described.

Depending upon the conditions encountered and the effect desired, the openings 9 and the sleeve 10 may be dispensed with thereby providing a simplified version of the fishing device of the invention.

The device of the invention will find particular use in so-called "free shrimping" fishing wherein the leaders 7 may be relatively long and flexible so as to permit live bait to swim about some limited extent without becoming entangled with the adjacent leader and hook.

The device may also find particular use in using live bait in areas in which there are weeds, limbs or sticks or the like in that the device of the invention will provide for limited movement of the live bait and yet the weight of the device may be such that the live bait cannot easily move it into such weeds, sticks or the like.

It is of course apparent that the elongate body member 2 may be transparent or translucent, or if desired, the body member 2 may be colored either on the exterior thereof or the interior thereof or both.

Referring to FIGURE 3, another embodiment of the invention is shown having a generally cylindrical body portion 11 which has holes 6a therethrough to accommodate the leaders 7 as previously described. The upper end of the member 11 may be flattened as shown at 12 to close such end and the flattened portion 12 may have an opening 13 therethrough so that a fishing line may be attached thereto. The upper end of the device may be thickened as shown generally at 14, and may have a series of annular grooves 15 and 15a spaced alternately therealong. Grooves 15a may have holes 16 extending into the interior of the body member 11.

A plurality of resilient annular rings 17 may be placed in the grooves 15. The rings 17 may be made of rubber, neoprene or the like. Since only the alternate grooves 15a are drilled as shown at 16, only half as many rings 17 are required as there are grooves 15 and 15a. Thus when it is desired to change the buoyancy of the device, a ring 17 may be moved from a groove 15 which has no holes to the adjacent groove 15a which does have holes, in order to cover the same to vary the buoyancy characteristics of the device of the invention. Of course, if desired, each of the rings 17 may be moved to its adjacent groove 15a whereby all of the holes may be covered by the rings 17 to provide full flotation characteristics for the device. All that is required to move a ring from the groove 15 to the groove 15a is to push it from one groove to the adjacent groove by hand, the rings 17 being sufficiently elastic to pass over the raised portion 18 when it is so pushed by the operator.

I have found that the device of the invention functions in the manner intended when the body portion thereof is approximately nine inches long, and the outside diameter of said body portion is approximately five sixteenths of an inch and where the body member has a wall thickness of approximately .040 inch.

When the device of the invention is retrived for rebaiting or the like, the water which may remain trapped therein may be removed by shaking the device sharply to remove the water therefrom so that the desired buoyancy characteristics of the device are obtained.

The invention is not limited to the embodiments shown. Various changes within the scope of the following claims will occur to those skilled in the art.

I claim:

1. A fishing tackle device comprising an elongate, hollow body member open at its lower end and closed at its upper end, means at its upper end for attachment to the end of a fishing line, the said body having pairs of holes therethrough disposed longitudinally along said member, a flexible leader extending through each pair of said holes and secured to said body, a fishing hook secured to the other end of said leader, the upper portion of the hollow body member having a plurality of openings therethrough, an annular sleeve frictionally engaging the outer surface of said body member and slidable thereon to cover at least a portion of said openings whereby varying amounts of air may be trapped in the upper portion of said hollow body member when the said device is immersed in water.

2. A fishing tackle device comprising an elongate hollow body member open at its lower end and closed at its upper end, leaders secured to said body member and extending therefrom, hooks on said leaders, the upper portion of said hollow body member having a series of annular grooves on the exterior surface thereof, the bottom of each alternate groove having holes extending to the interior of said body member, an elastic annular ring disposed in each groove adjacent the groove having said holes in the bottom thereof, the said elastic rings being movable to adjacent grooves to cover the said holes to vary the buoyancy of the device when it is immersed in water.

3. A fishing tackle device comprising an elongate body member closed at its upper end, leaders secured to said body member and extending therefrom, hooks on said leaders, the upper portion of said body member having at least two annular grooves in the exterior surface thereof, one of the grooves having holes in the bottom thereof communicating with the interior of said body member, an elastic annular ring disposed in the other said groove, the said ring being movable to the first mentioned groove and adapted to seal the holes in the bottom thereof.

4. A fishing tackle device comprising an elongate hollow body member closed at its upper end and adapted to trap air therein when it is immersed in water, leaders secured to said body member and extending therefrom, hooks on said leaders, the upper portion of said body member having openings therethrough, and means on said body member associated with said openings and adapted to vary the volume of air to be trapped in said body member.

References Cited by the Examiner

UNITED STATES PATENTS

| 2,877,593 | 3/59 | Baldridge | 43—42.74 |
| 3,084,471 | 4/63 | Alspaugh | 43—43.14 X |

FOREIGN PATENTS

| 21,622 | 4/92 | Great Britain. |
| 605,913 | 8/48 | Great Britain. |

ABRAHAM G. STONE, *Primary Examiner.*